US009172261B2

(12) United States Patent
Suzuki

(10) Patent No.: US 9,172,261 B2
(45) Date of Patent: Oct. 27, 2015

(54) BATTERY PACK, METHOD OF CHARGING SECONDARY BATTERY AND BATTERY CHARGER

(75) Inventor: Isao Suzuki, Saitama (JP)

(73) Assignee: Sony Corporation, Tokyo (JP)

( * ) Notice: Subject to any disclaimer, the term of this patent is extended or adjusted under 35 U.S.C. 154(b) by 722 days.

(21) Appl. No.: 12/260,801

(22) Filed: Oct. 29, 2008

(65) Prior Publication Data

US 2009/0112496 A1    Apr. 30, 2009

(30) Foreign Application Priority Data

Oct. 30, 2007    (JP) .................................. 2007-281764

(51) Int. Cl.
*G01R 31/36*    (2006.01)
*H02J 7/00*    (2006.01)

(52) U.S. Cl.
CPC ............. *H02J 7/0022* (2013.01); *H02J 7/0026* (2013.01)

(58) Field of Classification Search
CPC ........................... G01R 31/3648; H02J 7/0026
USPC .......................................................... 702/63
See application file for complete search history.

(56) References Cited

U.S. PATENT DOCUMENTS

| 5,525,890 A * | 6/1996 | Iwatsu et al. ................... 320/106 |
| 5,789,900 A * | 8/1998 | Hasegawa et al. ............ 320/132 |
| 6,064,179 A * | 5/2000 | Ito et al. ......................... 320/128 |
| 6,160,380 A * | 12/2000 | Tsuji et al. ..................... 320/132 |
| 2002/0110518 A1 * | 8/2002 | Okuda et al. ................... 423/594 |
| 2003/0008201 A1 * | 1/2003 | Komori et al. ................... 429/49 |
| 2003/0030414 A1 * | 2/2003 | Suzuki ........................... 320/136 |
| 2006/0028172 A1 * | 2/2006 | Vaillancourt et al. ......... 320/110 |
| 2006/0158155 A1 * | 7/2006 | Tamezane et al. ............. 320/132 |
| 2007/0194754 A1 * | 8/2007 | Fukuzawa et al. ............ 320/112 |

FOREIGN PATENT DOCUMENTS

| JP | 11-174136 | 7/1999 |
| JP | 2000-215923 | 8/2000 |
| JP | 2000215923 A * | 8/2000 |
| JP | 2002-272011 | 9/2002 |

(Continued)

OTHER PUBLICATIONS

JP 2005086849 A—English Translation.*

(Continued)

*Primary Examiner* — Patrick Assouad
*Assistant Examiner* — Haidong Zhang
(74) *Attorney, Agent, or Firm* — K&L Gates LLP

(57) ABSTRACT

A battery pack includes a secondary battery including a plurality of cell blocks, a measuring section, a charge and discharge control switch, a protection circuit, and a memory. The measuring section detects a voltage, a current, and an internal resistance, of the secondary battery. The controller monitors the voltage and the current of the secondary battery and outputs a request signal indicative of a charge condition to charge the secondary battery in accordance with the charge condition which is set. The protection circuit monitors voltages of the plurality of cell blocks. The memory registers an initial internal resistance of the secondary battery. The controller calculates a deterioration coefficient by a ratio of the internal resistance detected by the measuring section to the initial internal resistance registered in the memory, and changes the charge condition in accordance with the deterioration coefficient.

20 Claims, 9 Drawing Sheets

(56) References Cited

FOREIGN PATENT DOCUMENTS

| | | |
|---|---|---|
| JP | 2004-222427 | 8/2004 |
| JP | 2005086849 A * | 3/2005 |
| JP | 2006-098135 | 4/2006 |

OTHER PUBLICATIONS

Japanese Office Action issued on Sep. 8, 2009, for corresponding Japanese Patent Application JP 2007-281764.

* cited by examiner

BATTERY PACK, METHOD OF CHARGING SECONDARY BATTERY AND BATTERY CHARGER

CROSS-REFERENCE TO RELATED APPLICATIONS

The present application claims benefit of priority of Japanese patent Application No. 2007-281764 filed in the Japanese Patent Office on Oct. 30, 2007, the entire disclosure of which is incorporated herein by reference.

BACKGROUND

The present application relates to a battery pack, a method of charging a secondary battery, and a battery charger. More particularly, the application relates to a battery pack, a method of charging a secondary battery, and a battery charger, which control a charge condition in accordance with the deterioration coefficient of a secondary battery.

A combination of constant-current charge and constant-voltage charge (constant-current constant-voltage method) is known as a method of charging a secondary battery. This charging method will be described with reference to FIG. 9, on which the abscissa represents charging time and the ordinate represents cell voltage and charging current. In FIG. 9, the region indicated by arrows a and b (hereinafter referred to as a "region a-b") is the range of constant-current charge, and the region indicated by arrows c and d (hereinafter referred to as a "region c-d") is the range of constant-voltage charge. The arrow I indicates charging current, and the arrow V indicates cell voltage. A power supply section for charging performs the operation of constant-current control in the region a-b, and performs the operation of constant-voltage control in the region c-d.

As shown in FIG. 9, during the region a-b, the constant-current charge is performed by a predetermined current value, and then the cell voltage rises. In this example, the charging current is maintained at, for example, 3300 mA. When the charging proceeds, so that the cell voltage reaches a predetermined voltage value, for example, 4100 mV, switching takes place from constant-current charge to constant-voltage charge. During the region c-d, the charging current is gradually lowered, and the cell voltage rises toward the output voltage (e.g. 4200 mV) of the power supply section. Thereafter, the charging is completed when the charging current becomes smaller than a predetermined value (a current value at end-of-charge).

The secondary battery gradually deteriorates with increasing the number of charge and discharge cycles, where each cycle consists of charge, and discharge and pause, as described above. The secondary battery deterioration has been determined by the count of charge and discharge cycles, the actual discharge amount, or charging time. For example, in the method using the count of charge and discharge cycles, the number of charge and discharge cycles is calculated by using charging amount or discharging amount, and a deterioration coefficient is obtained from the number of charge and discharge cycles. When the actual discharging amount is used, a deterioration coefficient is obtained from the actual discharging amount and a design capacity value by using a calculation equation: Deterioration coefficient=Design value capacity/Actual discharging amount.

Japanese Unexamined Patent Application Publication No. H11-174136 discloses the method including the steps of measuring the effective resistance in a battery pack and determining the deterioration thereof by the measured value. When the effective resistance is used, the deterioration can be determined in a short time.

SUMMARY

In the charging by the constant-current constant-voltage method described above, the charging current value during a constant-current charge period, and the charging voltage value are set to fixed values, respectively. Accordingly, when the battery pack deterioration progresses to raise the internal resistance, the rise in voltages is large in proportion to the rise in internal resistance. As a result, the time of the region a-b which is the range of constant-current charge becomes short, and the time of the region c-d which is the range of constant-voltage charge becomes long, as shown in FIG. 10.

When the range of constant-voltage charge increases in length, the time period over which the secondary battery has a high voltage of, for example, 4100 mV and above, becomes long, so that the secondary battery deterioration is accelerated. It is therefore desirable to control the charge condition in accordance with the progress of the secondary battery deterioration.

However, a known method of determining the secondary battery deterioration does not calculate the deterioration coefficient properly. For example, in the method using the count of the charge and discharge cycles, the deterioration due to preservation, namely when the secondary battery is preserved for a long time, is not reflected, making it difficult to accurately calculate the deterioration coefficient. Further, in the method of calculating a deterioration coefficient based on the discharging amount and the charging time, an error may occur between the design capacity and the actual secondary battery capacity. This method is also considerably affected by the battery states such as discharging, standing, and charging, as well as temperature conditions. These make it difficult to obtain an accurate deterioration coefficient. Thus, it has been difficult to obtain a proper charge condition depending upon the secondary battery deterioration.

Accordingly, it is desirable to provide a battery pack, a method of charging a secondary battery, and a battery charger, which are capable of suppressing the progress of the secondary battery deterioration by accurately calculating a deterioration coefficient depending upon the secondary battery deterioration, and controlling a charge condition on the basis of the calculated deterioration coefficient.

In an embodiment, there is provided a battery pack which includes a secondary battery including a plurality of cell blocks, a measuring section, a controller, a charge and discharge control switch, a protection circuit, and a memory. The measuring section detects a voltage, a current, and an internal resistance, of the secondary battery. The controller monitors the voltage and the current of the secondary battery and outputs a request signal indicative of a charge condition to charge the secondary battery in accordance with the charge condition which is set. The charge and discharge control switch prevents overcharge and overdischarge. The protection circuit monitors voltages of the plurality of cell blocks. The memory registers an initial internal resistance of the secondary battery. The controller calculates a deterioration coefficient by a ratio of the internal resistance detected by the measuring section to the initial internal resistance registered in the memory, and changes the charge condition in accordance with the deterioration coefficient.

In another embodiment, there is provided a method of charging a secondary battery including the steps of: detecting a voltage, a current, and an internal resistance, of a secondary battery; and monitoring the voltage and the current of the secondary battery and outputting a request signal indicative of a charge condition to charge the secondary battery in accordance with the charge condition which is set. In the step of outputting the request signal, a deterioration coefficient is calculated by a ratio of the internal resistance detected to the initial internal resistance of the secondary battery registered in the memory, and the charge condition is changed depending upon the deterioration coefficient.

In a further embodiment, there is provided a battery charger which includes a secondary battery, a measuring section, a controller, a memory, and a charge controller. The measuring section detects a voltage, a current and an internal resistance, of the secondary battery. The controller monitors the voltage and the current of the secondary battery and outputs a request signal indicative of a charge condition to charge the secondary battery in accordance with the charge condition which is set. The memory registers an initial internal resistance of the secondary battery. The charge controller controls outputs of the charging current and the charging voltage of the secondary battery in accordance with the request signal outputted from the controller. The controller calculates a deterioration coefficient by a ratio of the internal resistance detected by the measuring section to the initial internal resistance registered in the memory, and changes the charge condition depending upon the deterioration coefficient.

Preferably, the charge condition includes a charging current value in constant-current charge, and the charging current value is changed depending upon the deterioration coefficient.

Preferably, the charge condition includes a charging voltage value, and the charging voltage value is changed depending upon the deterioration coefficient.

Preferably, the initial internal resistance is measured within a predetermined time period after manufacturing.

Preferably, the controller calculates the deterioration coefficient by a ratio of a maximum internal resistance among the plurality of cell blocks to the initial internal resistance of a cell block exhibiting the maximum internal resistance.

According to an embodiments, the deterioration coefficient is calculated from the ratio of the initial internal resistance of the secondary battery to the measured current internal resistance, making it possible to calculate a proper deterioration coefficient depending upon the secondary battery deterioration.

Thus, the proper deterioration coefficient is calculated depending upon the secondary battery deterioration, and the charge conditions of the secondary battery are dynamically controlled on the basis of the calculated deterioration coefficient. It is therefore capable of suppressing that the secondary battery is charged in a high voltage state for a long time, thereby suppressing the progress of the secondary battery deterioration.

Additional features and advantages are described herein, and will be apparent from the following Detailed Description and the figures.

DETAILED DESCRIPTION

Figure 1:
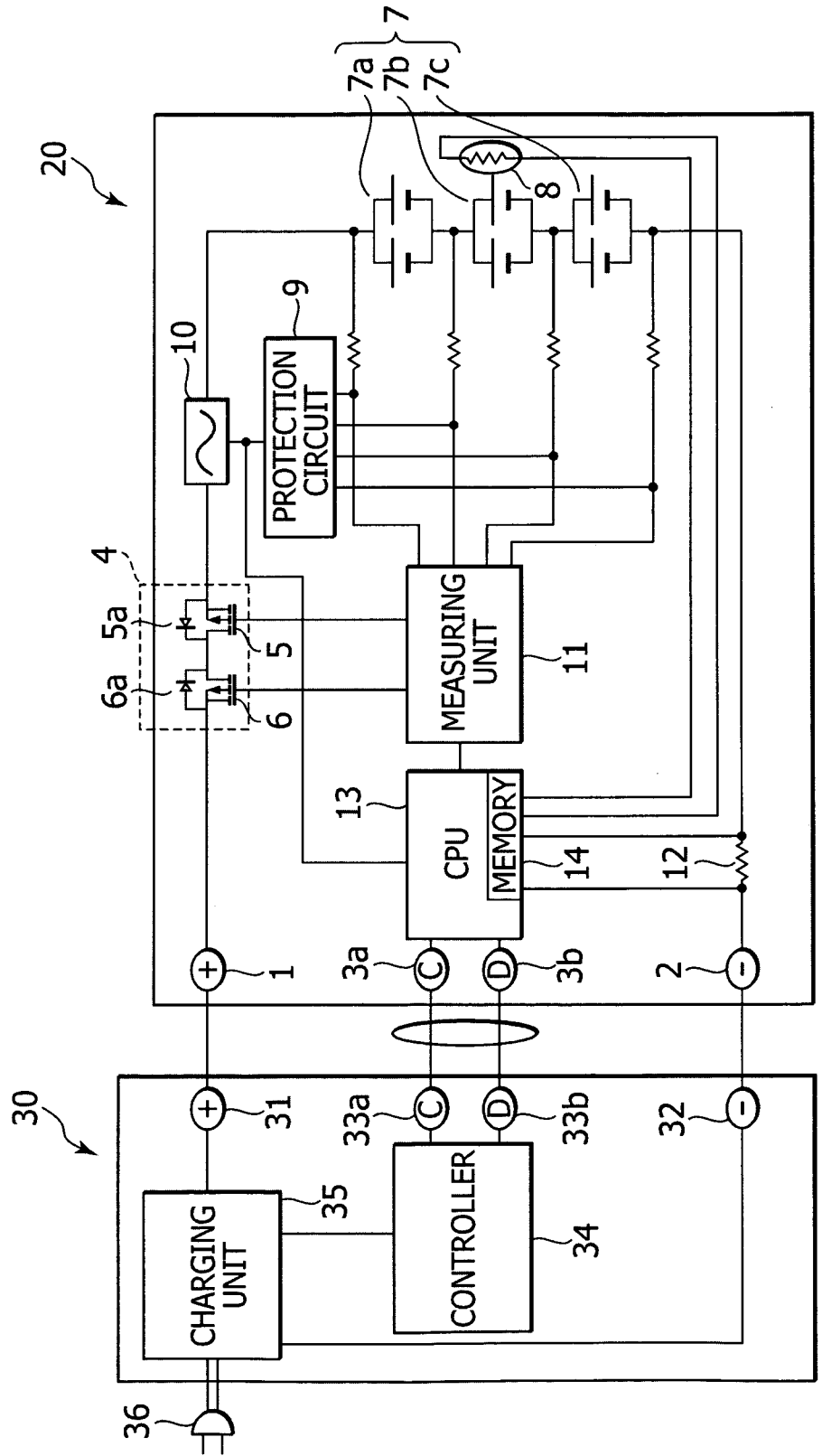
FIG. 1 is a schematic diagram showing an example of the battery pack structure according to an embodiment.

An embodiment will be described below with reference to the accompanying drawings. FIG. 1 is a block diagram showing a configuration example of a battery pack 20 according to an embodiment, and that of a notebook-type personal computer (PC) 30 connected to the battery back 20.

A positive terminal 1 and a negative terminal 2 of the battery pack 20 are connected to a positive terminal 31 and a negative terminal 32 of the notebook type PC 30, respectively. A clock terminal 3a and a communication terminal 3b of the battery pack 20 are connected to a clock terminal 33a and a communication terminal 33b of the notebook type PC 30, respectively. The battery pack 20 is a so-called smart battery, which is capable of performing communication with the notebook-type PC 30 through the communication terminal 3b to send information about the state of the battery pack 20. Upon the receipt of the information, the notebook-type PC 30 controls the output of a current value or a voltage value depending upon the state of the battery pack 20, and charges a secondary battery 7 by the constant-current constant-voltage charge method. In FIG. 1, for the sake of simplification of the configuration of the notebook type PC 30, only the configuration related to charging is shown.

The battery pack 20 includes mainly the secondary battery 7, a temperature detecting element 8, a protection circuit 9, a fuse 10, a measuring section 11, a current detecting resistor 12, a CPU 13, and a charge and discharge control switch 4. The positive terminal 1 of the battery pack 20 is connected to the positive terminal of the secondary battery 7 through the charge and discharge control switch 4 and the fuse 10. The negative terminal 2 is connected to the negative terminal of the secondary battery 7 through the current detecting resistor 12.

A measuring section for detecting a voltage, which is a constituent feature, corresponds to the measuring section 11, and a measuring section for detecting a current and an internal resistance corresponds to the CPU 13. A controller to output a request signal indicative of a charge condition corresponds to the CPU 13. A memory which registers the initial internal resistance corresponds to the memory 14.

The secondary battery 7 is a secondary battery such as a lithium ion battery, and has the configuration of connecting in series a cell block 7a, a cell block 7b, and a cell block 7c, each having, for example, two battery cells arranged in parallel.

For example, a secondary battery, whose full charge voltage per battery cell is 4.2 V, can be used as the secondary battery 7.

The measuring section 11 measures each of the voltages of the cell blocks 7a, 7b, and 7c included in the battery pack, and supplies the measured values to the CPU 13. In the following, the individual voltages of the cell blocks 7a, 7b, and 7c, each having two battery cells are referred to as "cell voltage". The measuring section 11 also has a function as a regulator which generates a power supply voltage by stabilizing the voltage of the secondary battery 7.

When the cell voltage of any one of these cell blocks 7a, 7b, and 7c becomes an overcharge detecting voltage, or when any one of the cell voltages is below an overdischarge detecting voltage, the measuring section 11 prevents overcharging and overdischarging by transmitting a control signal to the charge and discharge control switch 4. In the case of the lithium ion battery, the overcharge detecting voltage is set to, for example, 4.2 V±0.5 V, and the overdischarge detecting voltage is set to, for example, 2.4 V±0.1 V.

The charge and discharge control switch 4 is composed of a charge control FET (field effect transistor) 5 and a discharge control FET 6. A parasitic diode 5a exists between the drain and the source of the charge control FET 5, and a parasitic diode 6a exists between the drain and the source of the charge control FET 6. The parasitic diode 5a has a backward polarity with respect to charging current flowing in the direction from the positive terminal 1 to the secondary battery 7, and a forward polarity with respect to discharge current flowing in the direction from the negative terminal 2 to the secondary battery 7. The parasitic diode 6a has a forward polarity with respect to the charging current, and a backward polarity with respect to the discharge current.

Control signals from the measuring section 11 are supplied to the respective gates of the charge control FET 5 and the discharge control FET 6. In the normal charge and discharge operations, the control signals are set at a low level to turn the charge control FET 5 and the discharge control FET 6 on-state. Since the charge control FET 5 and the discharge control FET 6 are of P-channel type, both are turned to the on-state by a gate potential that is lower than a source potential by a predetermined value or above.

When the battery voltage becomes the overcharge detecting voltage, the charge control FET 5 is turned off to control so that no charging current flows. When the battery voltage becomes the overdischarge detecting voltage, the discharge control FET 6 is turned off to control so that no discharging current flows.

The protection circuit 9 monitors the voltages of the cell blocks 7a, 7b, and 7c, and melts the fuse 10 connected to the protection circuit 9 for the safety of the battery pack 20 when the cell voltage exceeds a charge inhibiting voltage (e.g. 4.30 V). When the fuse 10 is melted, the battery pack 20 becomes permanent failure mode in which neither charging nor discharging is possible.

The CPU 13 uses the current detecting resistor 12 to measure the magnitude and direction of current. The CPU 13 also captures the battery temperature measured by the temperature detecting element 8 formed by a thermistor or the like. The CPU 13 calculates the internal resistance values of the individual cell blocks by the voltage values supplied from the measuring section 11, and the measured current values and temperatures. These measured values are stored in the memory 14 included in the CPU 13. The memory 14 is composed of, for example, a non-volatile electrically erasable and programmable read only memory (EEPROM) or the like.

The initial internal resistances of the cell blocks 7a, 7b, and 7c are registered in the memory 14. Each of the initial internal resistance is the internal resistance measured before using the battery pack 20, and is obtained by measuring the internal resistance of the cell blocks within a predetermined time period (for example, within three months) after manufacturing the battery pack 20. A specific procedure of registering the initial internal resistances will be described later.

Using, as a reference value, the initial internal resistances of the individual cell blocks registered in the memory 14, the CPU 13 calculates the degrading coefficient of the secondary battery 7 by using these initial internal resistances and the internal resistances of the cell blocks 7a, 7b, and 7c supplied from the measuring section 11, based on the following equation (1).

$$\text{Deterioration coefficient} = \text{Initial internal resistance} / \text{Measured internal resistance} \quad (1)$$

In the equation (1), the maximum value among the internal resistances of the cell blocks 7a, 7b, and 7c is used as the measured internal resistance, and the initial internal resistance value of the cell block exhibiting the maximum internal resistance is used as the initial internal resistance. In the cell block having a high internal resistance, the cell voltage is likely to rise. Consequently, it becomes possible to reduce the possibility of overcharging by obtaining the deterioration coefficient by using the cell block value having a high internal resistance.

The CPU 13 also obtains a suitable charge condition of the secondary battery 7 on the basis of the obtained deterioration coefficient of the secondary battery 7, as will be described later. The charge condition of the secondary battery 7 includes a charging current value, a charging voltage value and the like, and these values are changed depending upon the deterioration coefficient. The charge condition is also stored in the memory 14 and updated whenever the suitable charge condition is obtained.

The CPU 13 monitors the voltage and the current of the secondary battery 7, and outputs a request signal indicative of a charge condition to the notebook type PC 30 through the communication terminal 3a and the communication terminal 33a, to charge properly the secondary battery 7 under the charge condition which is set.

The controller 34 of the notebook type PC 30 controls the output voltage and the output current of the charging section 35 in accordance with the charge condition supplied from the CPU 13. Specifically, at the beginning of charging, the controller 34 performs constant-current control to maintain the output current of the charging section 35 at the charging current value required by the CPU 13. Upon receiving notification from the CPU 13 that the cell voltage has reached a predetermined voltage, the controller 34 switches from constant-current charge to constant-voltage charge, and maintains the output voltage from the charging section 35 at a charging voltage value required by the CPU 13. Upon receiving notification from the CPU 13 that the charging current value has dropped to the current value at end-of charge, the controller 34 terminates the charging of the secondary battery 7.

The charging section 35 is connected through an AC connector 36 to a commercial power supply, and outputs DC power to the positive terminal 31 and the negative terminal 32 by AC-DC conversion. The current and the voltage outputted from the charging section 35 are stably maintained at a predetermined voltage value and a predetermined current value required by the battery pack 20, under the control of the controller 34.

The variable control of charge condition depending upon the deterioration coefficient of the secondary battery 7 will be described specifically below.

(1) First Example

The first example illustrates a case where the charging current value during a constant-current charge period is varied depending on the deterioration coefficient of the secondary battery 7.

Figure 2:
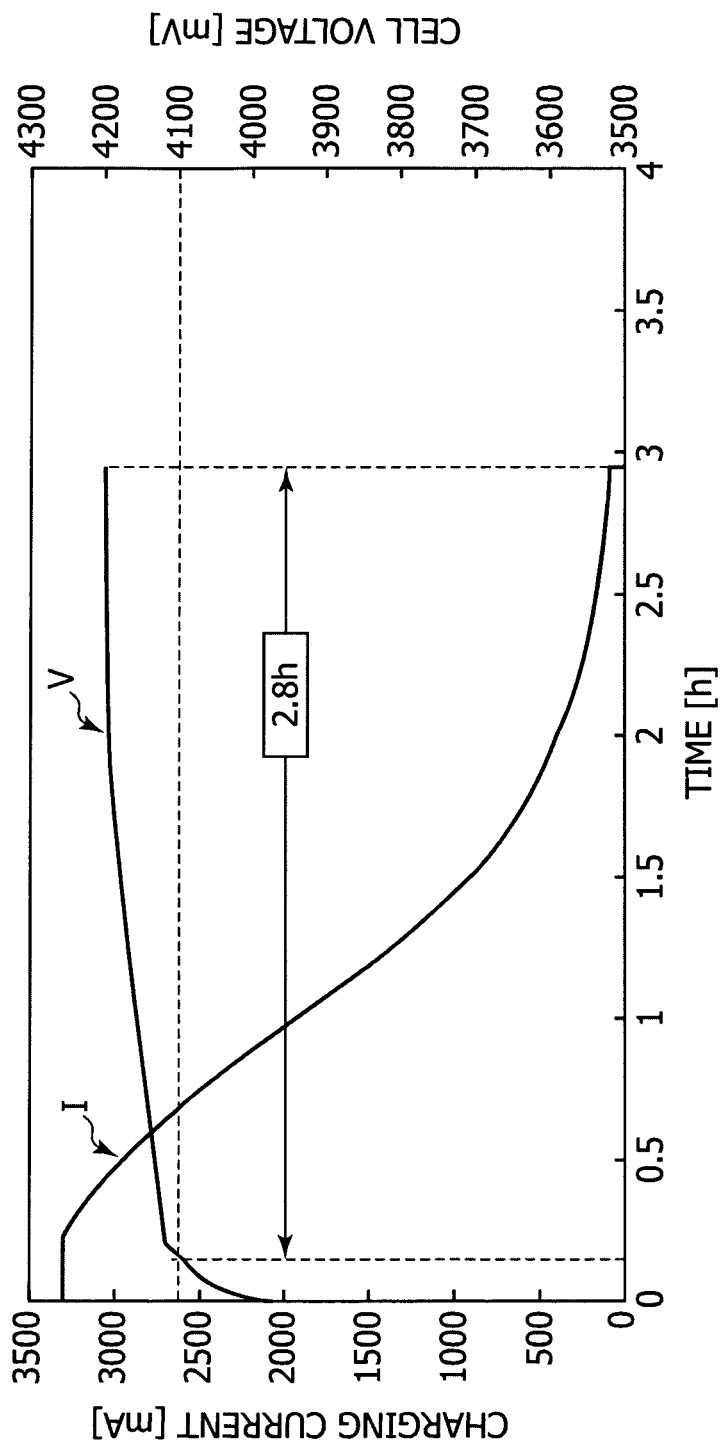
FIG. 2 is a graph showing an example of changes in charging current and cell voltage when a charge condition is fixed in the battery back after 500 cycles.
Figure 3:
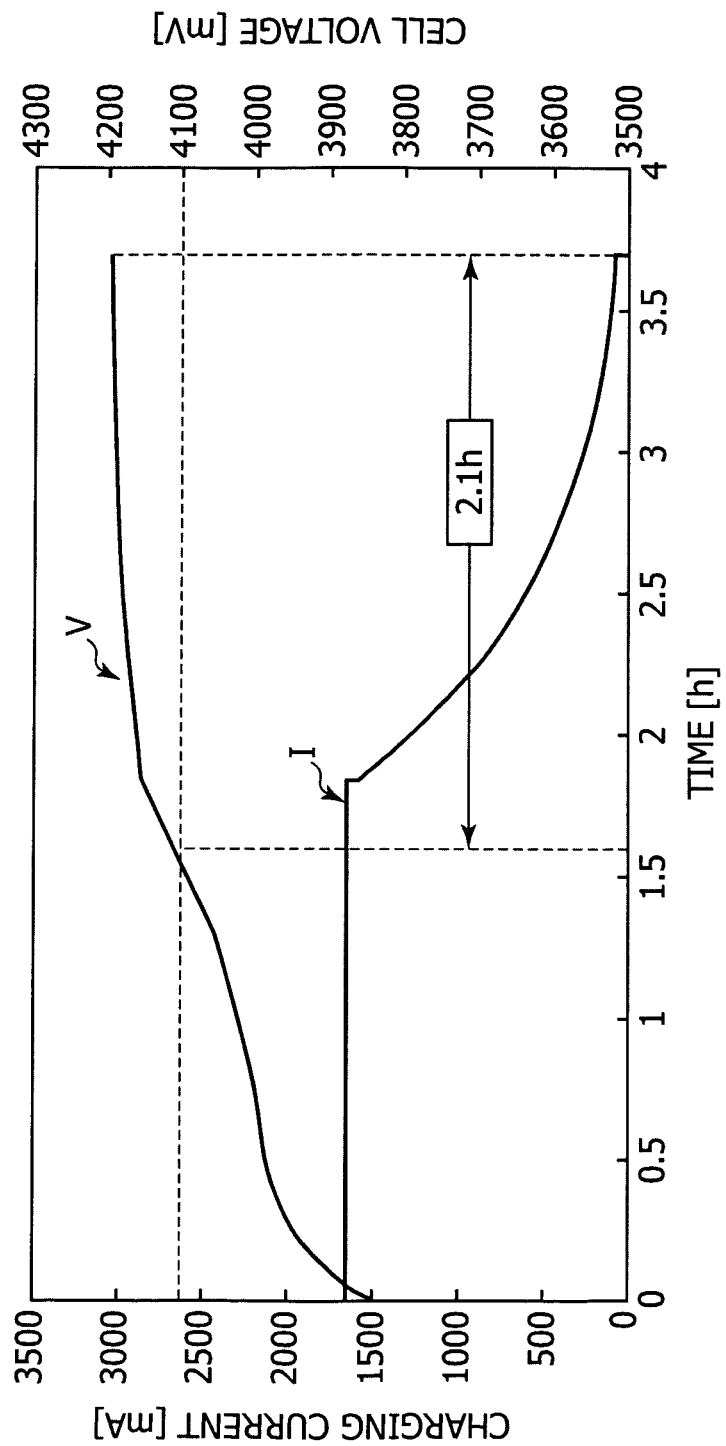
FIG. 3 is a graph showing an example of changes in charging current and cell voltage when charging current is changed in the battery back after 500 cycles.

FIGS. 2 and 3 are graphs showing examples of changes in charging current and cell voltage when the charging of constant-current constant-voltage method is performed in the battery back after 500-cycle repetition of charge and discharge, respectively. In FIGS. 2 and 3, the abscissa represents the charging time and the ordinate represents the charging current and cell voltage. When the battery pack is composed of a plurality of cell blocks as shown in FIG. 1, the cell voltages in FIGS. 2 and 3 indicate the maximum cell voltage value among these cell blocks. In FIGS. 2 and 3, the arrow I indicates charging current, and the arrow V indicates cell voltage.

FIG. 2 is an example in which the charge condition is fixed and a charging is performed under the charge condition in the initial setting. Here, the charge condition is as follows: 3300 mA of the charging current value of constant-current charge period in the initial setting (hereinafter referred to as initial charging current in some cases), and 4200 mV of the charging voltage value in the initial setting (hereinafter referred to as initial charging voltage in some cases).

The rise in cell voltage is generated by current and internal resistance, as expressed by the equation: Voltage rise=Charging current×Internal resistance. Therefore, the secondary battery 7 deteriorates due to repetition of charge and discharge cycles and the internal resistance rises, the voltage rise greatly in proportion to the rise in the internal resistance. Therefore, in the example shown in FIG. 2, a high voltage region having not less than 4100 mV accounts for 2.8 hours of the entire charging time of 2.9 hours. This means a 97% of the secondary battery 7 is subjected to the high voltage state of not less than 4100 mV during the charging, and thus the deterioration of the secondary battery 7 progresses.

Consequently, an abrupt rise in cell voltage is suppressed by performing variable control of charging current depending upon the deterioration coefficient of the secondary battery 7.

The deterioration coefficient is obtained from the above-mentioned equation (1). For example, when the initial internal resistance is 65 mΩ and the internal resistance measured after 500-cycle repetition of charge and discharge is 128 mΩ, the deterioration coefficient is obtained from the following equation:

$$\text{Deterioration coefficient} = 65\ m\Omega\ /128\ m\Omega \approx 0.507$$

A new charging current value in the constant-current charge period (hereinafter referred to as a variable charging current in some cases) is calculated from the obtained deterioration coefficient. A variable charging current value is obtained from the following equation (2).

(2) Variable charging current=Initial charging current× Deterioration coefficient For example, when the initial charging current is 3.3 A and the deterioration coefficient is 0.5, the variable charging current is obtained from the following equation.

$$\text{Variable charging current} = 3.3\ A \times 0.5 = 1.65\ A$$

FIG. 3 shows an example when charging is performed by the variable charging current thus obtained. As shown in FIG. 3, the abrupt rise in cell voltage can be suppressed by controlling the charging current in the constant-current charge period so as to be 1650 mA. In the example shown in FIG. 3, a high voltage region which has not less than 4100 mV accounts for 2.1 hours in the entire charging time of 3.7 hours. Namely, the rate at which the secondary battery 7 becomes a high voltage state of not less than 4100 mV during the charging is 57%.

As apparent from FIGS. 2 and 3, by changing the charging current depending upon the deterioration, the ratio of the time the secondary battery 7 into the high voltage state can be improved, for example, from 97% to 57%. It is therefore capable of suppressing the progress of deterioration of the secondary battery 7.

Hereinbelow, the steps in the procedure for registering an initial internal resistance and the procedure for variable control processing of charging current depending upon the deterioration of the secondary battery 7 will be described with reference to FIGS. 4 and 5.

Figure 4:
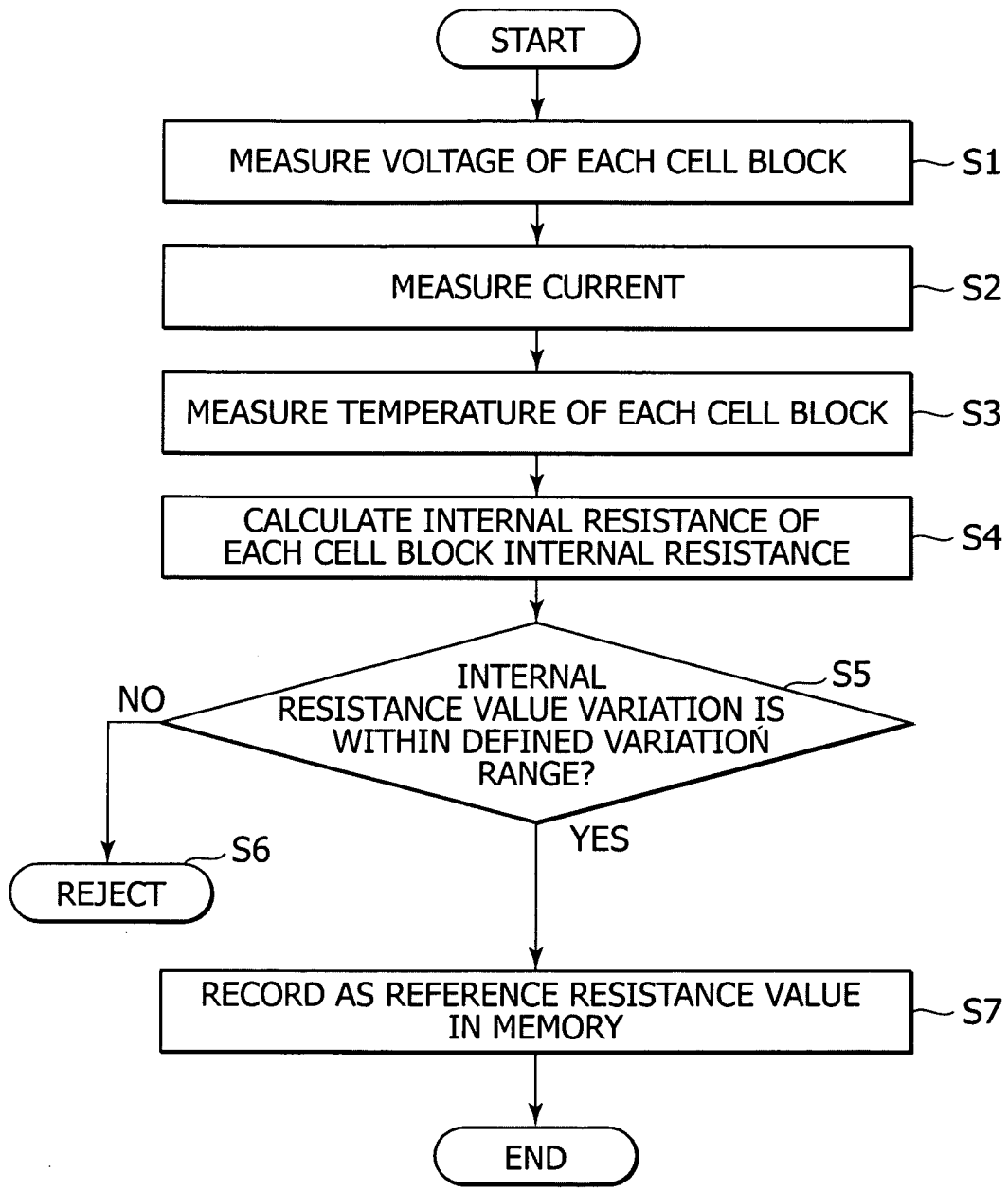
FIG. 4 is a flow chart schematically illustrating the procedure for obtaining an initial internal resistance value of the secondary battery in the embodiment.
Figure 5:
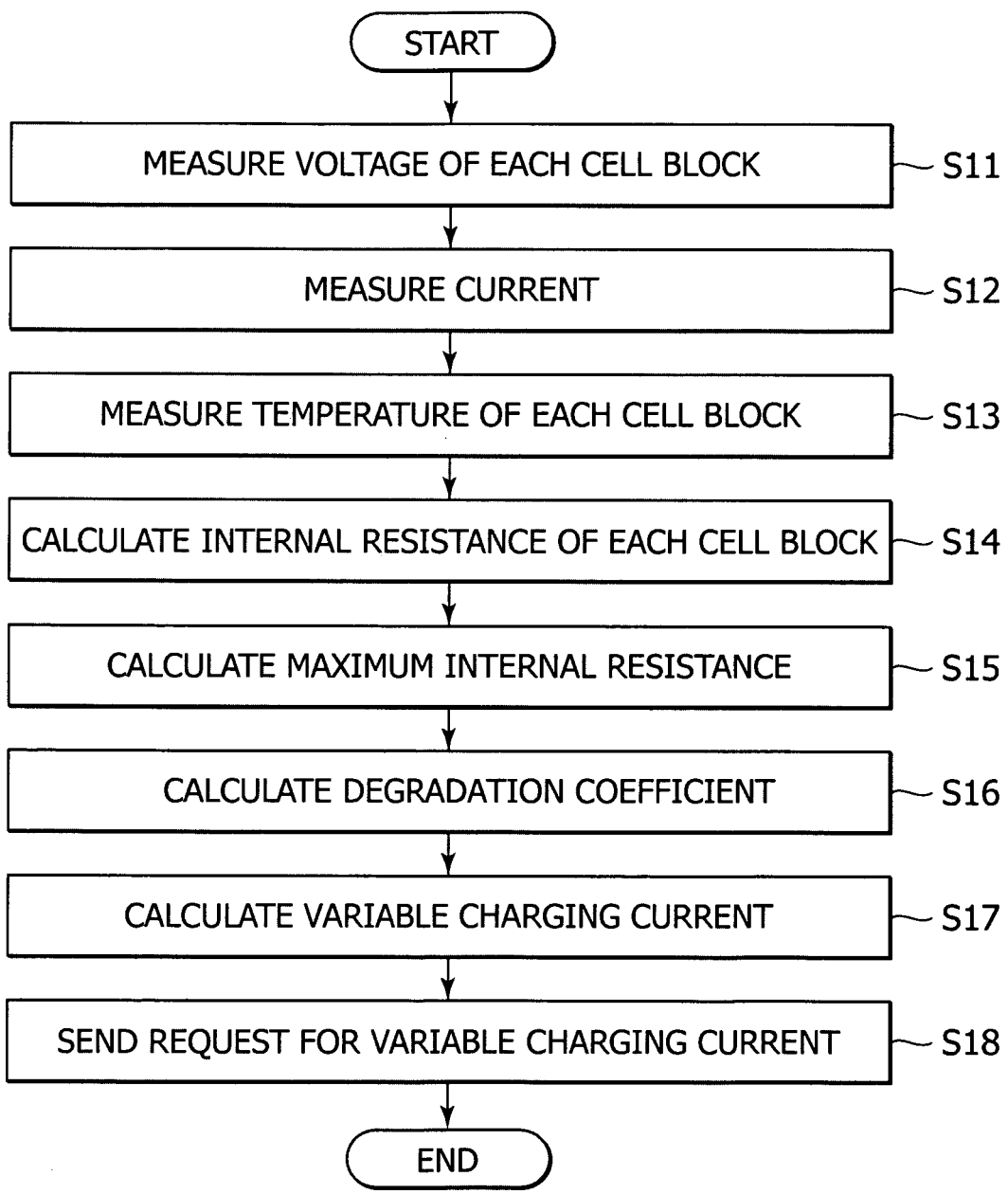
FIG. 5 is a flow chart schematically illustrating the steps in the variable control procedure of charging current depending upon the secondary battery deterioration in the embodiment.

FIG. 4 is a flow chart schematically illustrating the procedure for registering an initial internal resistance. The procedure shown in FIG. 4 is conducted to the battery pack 20 before use, for example, at the time of shipment from factory. In the procedure shown in FIG. 4, the battery pack 20 is in the state of connection with a power supply device capable of outputting current and voltage, or the like. The following procedures are performed by the CPU 13 unless otherwise noted.

First, in step S1, the measuring section 11 measures each of the voltages of the cell blocks 7a, 7b, and 7c. The measured values are supplied to the CPU 13.

Next, in step S2, the magnitude of the current of the battery pack 20 is measured. In Step S3, each of the battery temperatures of the cell blocks 7a, 7b, and 7c are measured.

Subsequently, in step S4, the initial internal resistances of these cell blocks are calculated by using the voltages supplied from the measuring section 11 and the measured currents and battery temperatures.

Then, in step S5, it is judged whether the initial internal resistance value variation of each cell block obtained in step S4 is within a defined range. If judged that the initial internal resistance value variation is larger than the defined range, the procedure proceeds to step S6.

In step S6, the fact that the initial internal resistance variation of each cell block is larger than the defined range is notified by, for example, sending a reject message to the power supply device to which the battery pack 20 is connected. The battery pack 20 notified of the reject message is not shipped and removed as not satisfying the product acceptability criterion.

On the other hand, if judged that the initial internal resistance value variation is within the defined range, the procedure proceeds to step S7. In step S7, the initial internal resistance calculated in step S4 is registered as a reference resistance value in the memory 14. Thus, the registration procedure of the initial internal resistance is terminated.

Next, the steps in the variable control procedure of charging current depending upon the deterioration of the secondary battery 7 will be described with reference to FIG. 5. In the procedure shown in FIG. 5, the battery pack 20 is connected to, for example, the notebook-type PC 30 and is in a state of chargeable by constant-current constant-voltage method. The following procedures are performed by the CPU 13 unless otherwise noted.

First, in step S11, the measuring section 11 measures each of the voltages of the cell blocks 7a, 7b, and 7c. The measured values are supplied to the CPU 13.

Next, in step S12, the magnitude of current of the battery pack 20 is measured. In step S13, the battery temperatures of each of the cell blocks 7a, 7b, and 7c are measured.

Subsequently, in step S14, the current internal resistances of the cell blocks are calculated by using the voltages supplied from the measuring section 11, and the measured current and battery temperatures.

Then, in step S15, the maximum internal resistance among the internal resistances of the individual cell blocks obtained in step S14 is obtained.

Then, in step S16, the deterioration coefficient of the secondary battery 7 is obtained from the ratio of the maximum internal resistance of the cell blocks obtained in step S14 to the initial internal resistance of the cell block exhibiting the maximum internal resistance. The above-mentioned equation (1) is used to calculate the deterioration coefficient.

Then, in step S17, a variable charging current value is calculated from the deterioration coefficient obtained in step S16 and the initial charging current. The above-mentioned equation (2) is used to calculate the variable charging current value.

In step S18, a request for a variable charging current is performed by outputting the variable charging current value to the controller 34 of the notebook-type PC 30. In accordance with the request for variable charging current from the CPU 13, the controller 34 of the notebook-type PC 30 controls to perform the constant-current charge of the secondary battery 7 while maintaining the output current from the charging section 35 at the variable charging current value.

(2) Second Example

The second example illustrates the case where the charging voltage is varied depending on the deterioration coefficient of the secondary battery 7.

Figure 6:
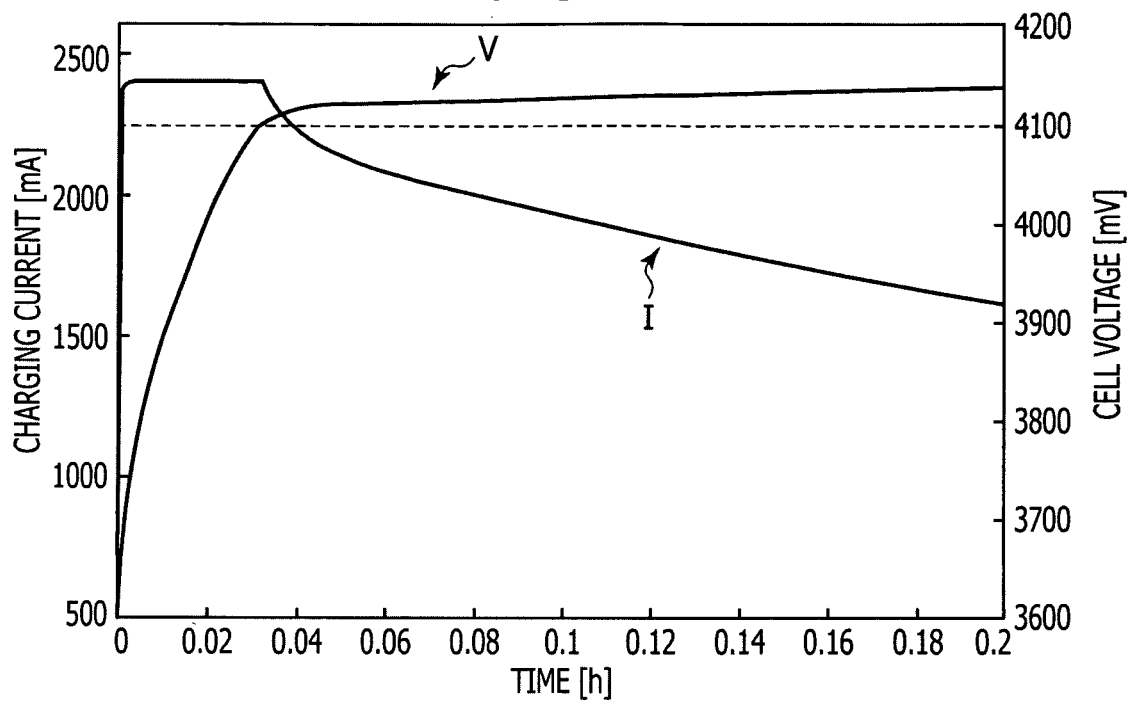
FIG. 6 is a graph showing other example of changes in charging current and cell voltage when a charge condition is fixed in the battery back after 500 cycles.
Figure 7:
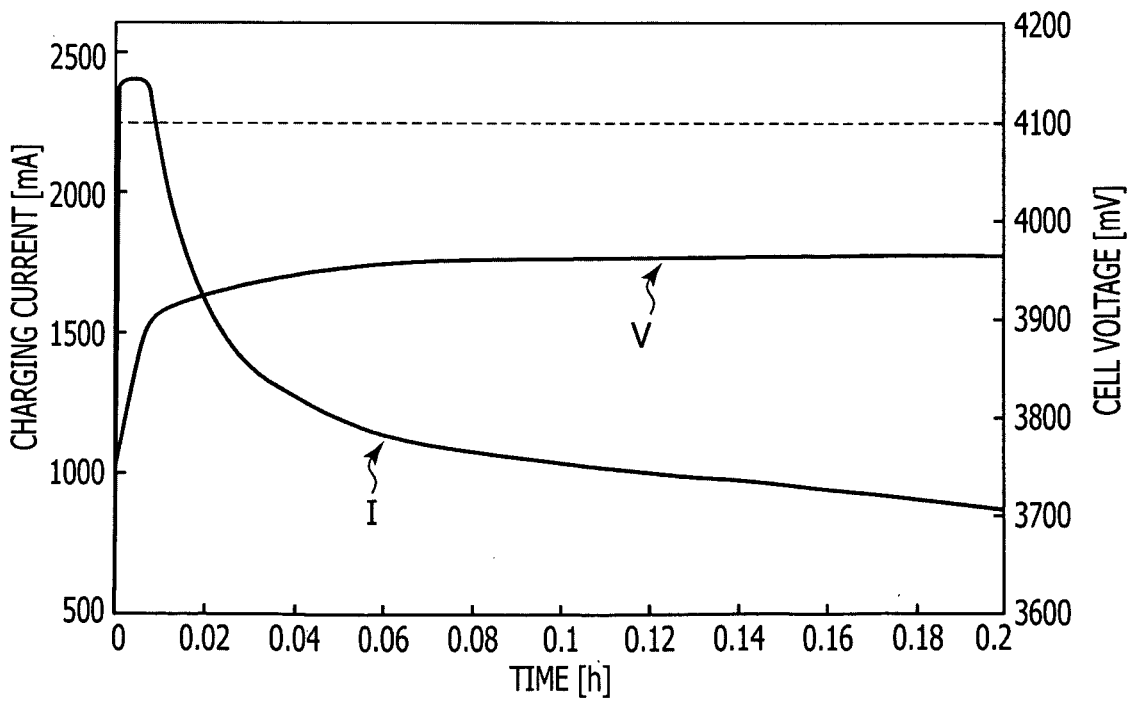
FIG. 7 is a graph showing an example of changes in charging current and cell voltage when charging voltage is changed in the battery back after 500 cycles.

FIGS. 6 and 7 show examples of changes in charging current and cell voltage when the charging of constant-current constant-voltage method is performed in the battery back after 500-cycle repetition of charge and discharge, respectively. In FIGS. 6 and 7, the abscissa represents charging time and the ordinate represents charging current and cell voltage. When the battery pack is composed of a plurality of cell blocks as shown in FIG. 1, the cell voltages in FIGS. 6 and 7 indicate the maximum cell voltage value among these cell blocks. In FIGS. 6 and 7, the arrow I indicates charging current, and the arrow V indicates cell voltage.

FIG. 6 is an example when a charge condition is fixed and the charging is performed under the charge condition in the initial setting. Here, the initial charging current is set to 2400 mA, and the initial charging voltage is set to 4200 mV.

As shown in FIG. 6, when the secondary battery 7 deteriorates due to the repetition of charge and discharge cycles and then the internal resistance rises, the abrupt voltage rise of the secondary battery 7 occurs. Consequently, the cell voltage goes into a high voltage region exceeding 4100 mV immediately after starting charging, so that the deterioration of the secondary battery 7 progresses.

Consequently, the charging of the secondary battery 7 in the high charging region is suppressed by performing variable control of charging voltage depending upon the deterioration coefficient of the secondary battery 7.

As in the case of the first example, the deterioration coefficient is obtained from the equation (1). For example, when the initial internal resistance is 65 mΩ and the internal resistance measured after 500-cycle repetition of charge and discharge is 85 mΩ, the deterioration coefficient is obtained from the following equation:

$$\text{Deterioration coefficient} = 65\ m\Omega,\ /85\ m\Omega \approx 0.764$$

A new charging voltage value (hereinafter referred to as a variable charging voltage in some cases) is calculated from the obtained deterioration coefficient. For example, assuming that the upper limit value of the variation range of variable charging voltage is 4.2 V which is the initial charging voltage value, and the lower limit thereof is 4.0 V, the variable charging voltage value is obtained from the following equation (3).

Variable charging voltage=4.0 V+(0.2 V×(1−Deterioration coefficient))  (3)

For example, assuming that the deterioration coefficient is 0.76, the variable charging voltage is obtained from the following equation.

$$\text{Variable charging voltage} = 4.0\ v + \{0.2\ V \times (1 - 0.76) \approx 4.05\ V$$

FIG. 7 shows an example when charging is performed by the variable charging voltage thus obtained. As shown in FIG. 7, by controlling the charging voltage to be at 4050 mV, the cell voltage prevents from entering a vigorous deterioration region of not less than 4100 mV.

As apparent from FIGS. 6 and 7, the charging of the secondary battery 7 in the high charging voltage region can be suppressed by changing the charging voltage depending upon deterioration. It is therefore capable of suppressing the progress of deterioration of the secondary battery 7.

Next, the steps in procedure of variable control of charging voltage depending upon deterioration will be described with reference to FIG. 8. The procedure for obtaining the initial internal resistance is identical to that described with reference to FIG. 4, and the description thereof is therefore omitted.

Figure 8:
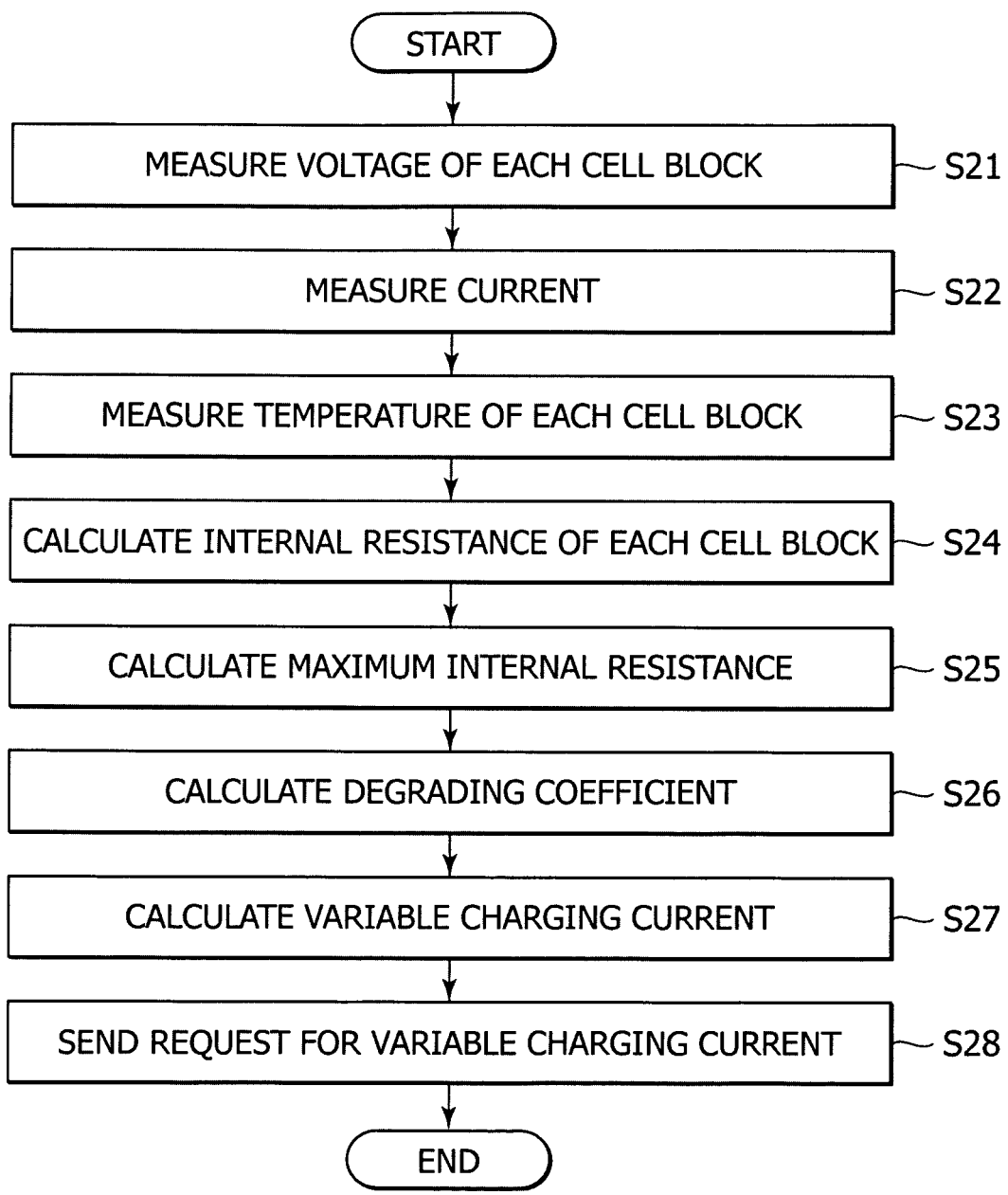
FIG. 8 is a flow chart schematically illustrating the steps of the variable control procedure of charging voltage depending upon the secondary battery deterioration in the embodiment.
Figure 9:
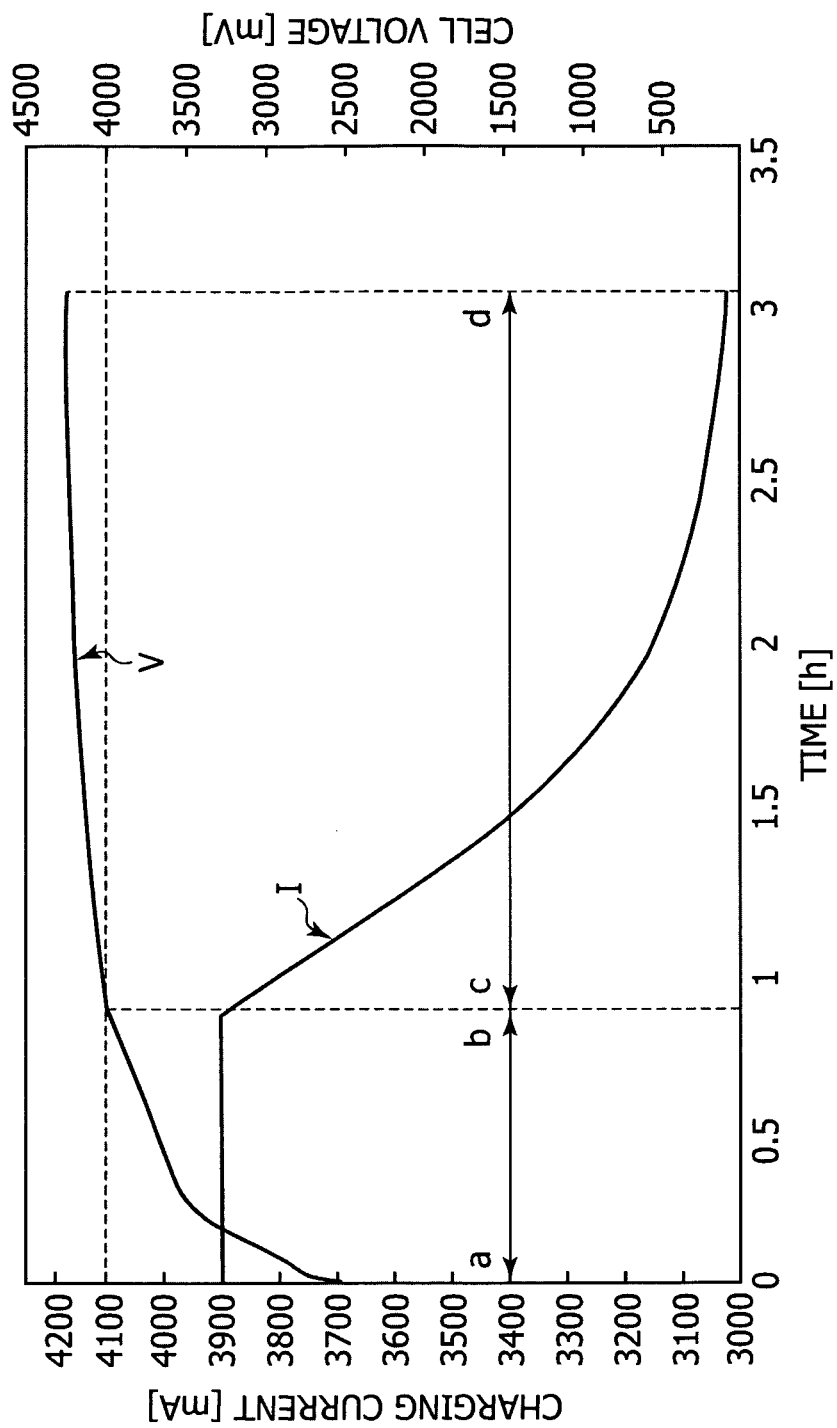
FIG. 9 is a graph for use in explaining constant-current constant-voltage charge.
Figure 10:
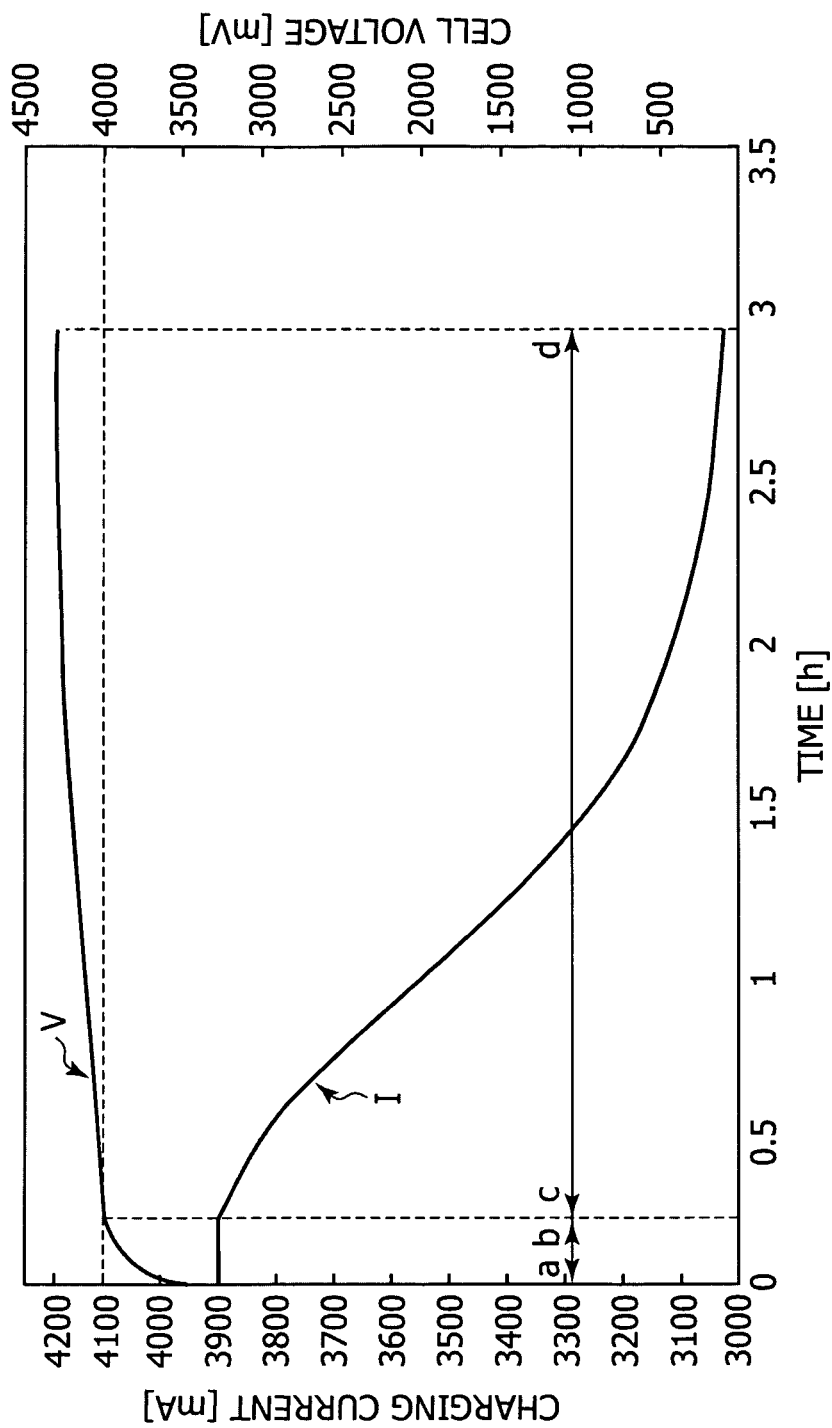
FIG. 10 is a graph for explaining charging current and cell voltage when a degraded secondary battery is charged.

FIG. 8 is a flow chart schematically illustrating the steps in the variable control procedure of charging voltage depending upon the deterioration of the secondary battery 7. In the procedure shown in FIG. 8, the battery pack 20 is connected to, for example, the notebook-type PC 30 and is in a state of chargeable by constant-current constant-voltage charge method. The following procedures are performed by the CPU 13 unless otherwise noted.

First, in step S21, the measuring section 11 measures each of the voltages of the cell blocks 7a, 7b, and 7c. The measured values are supplied to the CPU 13.

Next, in step S22, the magnitude of the current of the battery pack 20 is measured. In Step S23, each of the battery temperatures of these cell blocks 7a, 7b, and 7c are measured.

Subsequently, in step S24, the current internal resistances of the cell blocks are calculated by using the voltages supplied from the measuring section 11 and the measured currents and battery temperatures.

Then, in step S25, the maximum internal resistance among the internal resistances of these cell blocks obtained in step S24 is obtained.

Then, in step S26, the deterioration coefficient of the secondary battery 7 is obtained from the maximum internal resistance value of the cell blocks obtained in step S24, and the initial internal resistance value of the cell block exhibiting the maximum internal resistance value. The equation (1) is used to calculate the deterioration coefficient.

Then, in step S27, a variable charging voltage value is calculated from the deterioration coefficient obtained in step S26 and the initial charging voltage value. The equation (3) is used to calculate the variable charging voltage value.

Then, in step S28, a request for a variable charging voltage is performed by supplying the variable charging voltage value to the controller 33 of the notebook-type PC 30 connected to the battery pack 20. In accordance with the request for variable charging voltage from the CPU 13, the controller 34 of the notebook-type PC 30 controls to charge the secondary battery 7 while maintaining the output current from the charging section 35 at the variable charging voltage value.

As described above, in embodiments, the deterioration coefficient of the secondary battery 7 is calculated by using the initial internal resistances of the individual cell blocks as a reference value. This makes it possible to reflect the deterioration due to presentation, for example, when the secondary battery 7 is preserved for a long time, and also to calculate the deterioration coefficient at a desired timing. It is also capable of reducing the error of deterioration coefficient calculation caused by the difference in use conditions of the secondary battery 7. This enables the deterioration coefficient of the secondary battery 7 to be calculated properly and at high frequency.

The proper calculation of the deterioration coefficient of the secondary battery 7 provides a proper charge condition. The secondary battery 7 is subjected to proper constant-current constant-voltage charge under the obtained charge condition. It is therefore avoidable that the secondary battery 7 is charged in a high voltage state for a long time, thereby suppressing the progress of deterioration of the secondary battery 7.

Further, the deterioration coefficient of the secondary battery 7 is calculated by using the internal resistance of the cell having the highest internal resistance among the plurality of cell blocks. Therefore, even if variations occur in the internal resistances of the cell blocks, the secondary battery 7 of the cell block having the high internal resistance can prevent overcharging. Accordingly, the stability of the battery pack 20 can be further enhanced.

Although there has been shown herein and described embodiment, modifications may be made based on the technical concept of the application without limiting the above embodiments.

For example, the numerical values in the above embodiments are cited merely by way of example without limitation, and different numerical values may be used if needed.

The individual configurations of the above embodiment may be combined together, without departing from the gist.

Although, in the above embodiments, the deterioration coefficient is calculated from the following equation: Deterioration coefficient=Initial internal resistance value/Measured internal resistance value, the deterioration coefficient may be calculated from the following equation: Deterioration coefficient=(Measured internal resistance value−Initial internal resistance value)/Initial internal resistance value. In this case, using the obtained deterioration coefficient, the increasing rate of internal resistance is obtained by the following equation: Increasing rate of internal resistance=1−Deterioration coefficient. Then, the obtained rising rate of internal resistance and the initial charging current or the initial charging voltage can be used to calculate a variable charging current or a variable charging voltage.

Although, in the above embodiments, the lithium ion battery is used as the secondary battery 7, the secondary battery 7 is not limited thereto, and it is applicable to various types of batteries such as Ni—Cd (nickel-cadmium) battery, Ni-MH (nickel metal hydride) battery.

Although, in the above embodiments, the two parallel secondary batteries are series-arranged in the three blocks, no special limitation is imposed on the number and the configuration of the secondary battery included in the battery pack.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery pack comprising:
a secondary battery including a plurality of cell blocks;
a temperature detecting element configured to detect a temperature of each of the plurality of cell blocks;
a measuring section configured to detect a voltage, a current, and an internal resistance, of the secondary battery;
a controller configured to monitor the voltage and the current of the secondary battery and output a request signal indicative of a charge condition to charge the secondary battery in accordance with the charge condition which is set;
a charge and discharge control switch configured to prevent overcharge and overdischarge;
a protection circuit configured to monitor voltages of the plurality of cell blocks; and
a memory which registers an initial internal resistance of the secondary battery based on a variation of initial internal resistance values for each of the cell blocks being within a predetermined range, wherein the initial internal resistance of the secondary battery is a resistance before an initial use of the secondary battery corresponding to the initial internal resistance values,
wherein the controller obtains a maximum internal resistance among internal resistances of the plurality of cell blocks, calculates a deterioration coefficient by a ratio of the maximum internal resistance to the initial internal resistance of a cell block exhibiting the maximum internal resistance, and changes the charge condition in accordance with the deterioration coefficient, and
wherein the charge condition includes a charging current value in constant-current charge, and a new charging current value is set to a value equal to an initial charging current multiplied by the deterioration coefficient.

2. The battery pack according to claim 1, wherein:
the charge condition includes a charging voltage value, and
the charging voltage value is changed depending upon the deterioration coefficient.

3. The battery pack according to claim 1, wherein the initial internal resistance is measured within a predetermined time period after manufacturing.

4. The battery pack according to claim 1, wherein:
the charge and discharge control switch is composed of a charge control FET and a discharge control FET, and
in a normal charge and discharge operation,
a control signal is set at a low level to turn the charge control FET and the discharge control FET on-state.

5. The battery pack according to claim 4, wherein:
when a battery voltage becomes an overcharge detection voltage, the charge and discharge control switch is controlled to turn the charge control FET off so that a charging current does not flow, and when the battery voltage becomes an overdischarge detection voltage, the charge and discharge control switch is controlled to turn the discharge control FET off so that a discharging current does not flow.

6. The battery pack according to claim 1, wherein:
when a cell voltage of the cell blocks exceeds a charge inhibiting voltage, the protection circuit melts a fuse connected to the protection circuit to become a permanent failure mode.

7. The battery pack according to claim 1, wherein:
the memory is included in a CPU, and
the CPU measures a magnitude and a direction of a current by using a current detection resister, and captures a battery temperature measured by a temperature detection element.

8. The battery pack according to claim 1, wherein the measuring section detects an initial voltage of each of the plurality of cell blocks, and
the temperature detecting element detects an initial temperature of each of the plurality of cell blocks.

9. The battery pack according to claim 8, wherein the measuring section calculates an initial internal resistance of each of the plurality of cell blocks based on an initial current of the secondary battery, an initial voltage of a respective cell block, and an initial temperature of the respective cell block.

10. The battery pack according to claim 9, wherein the memory registers an initial internal resistance of each of the plurality of cell blocks.

11. The battery pack according to claim 1, wherein the measuring section detects a voltage of each of the plurality of cell blocks during charging, and
the temperature detecting element detects a temperature of each of the plurality of cell blocks during charging.

12. The battery pack according to claim 11, wherein the measuring section calculates an internal resistance of each of the plurality of cell blocks during charging based on a current of the secondary battery during charging, a voltage of a respective cell block during charging, and a temperature of the respective cell block during charging.

13. The battery pack according to claim 1, wherein the initial charging current is an initial setting of the constant-current charge.

14. A method of charging a secondary battery including a plurality of cell blocks, comprising:
detecting a temperature of each of the plurality of cell blocks;
detecting a voltage, a current, and an internal resistance, of the secondary battery; and
monitoring the voltage and the current of the secondary battery and outputting a request signal indicative of a charge condition to charge the secondary battery in accordance with the charge condition which is set,
wherein, in the step of outputting the request signal,
a deterioration coefficient is calculated by a ratio of a maximum internal resistance among internal resistances of the plurality of cell blocks detected during charging to an initial internal resistance of a cell block exhibiting the maximum internal resistance registered in a memory based on a variation of initial internal resistance values for each of the cell blocks being within a predetermined range, and the charge condition is changed depending upon the deterioration coefficient,
wherein the initial internal resistance of the secondary battery is a resistance before an initial use of the secondary battery,
wherein the charge condition includes a charging current value in constant-current charge, and a new charging current value is set to a value equal to an initial charging current multiplied by the deterioration coefficient.

15. The method of charging a secondary battery according to claim 14, wherein:
the charge condition includes a charging voltage value, and the charging voltage value is changed depending upon the deterioration coefficient.

16. The method of charging a secondary battery according to claim 14, wherein the initial internal resistance is measured within a predetermined time period after manufacturing.

17. The method of charging a secondary battery according to claim 14, wherein:
the secondary battery includes a plurality of cell blocks, and
a controller calculates the deterioration coefficient by a ratio of a maximum internal resistance among the plurality of cell blocks during charging to the initial internal resistance of a cell block exhibiting the maximum internal resistance.

18. A battery charger comprising:
a secondary battery including a plurality of cell blocks;
a temperature detecting element configured to detect a temperature of each of the plurality of cell blocks;
a measuring section configured to detect a voltage, a current, and an internal resistance, of the secondary battery;
a controller configured to monitor the voltage and the current of the secondary battery and output a request signal indicative of a charge condition to charge the secondary battery in accordance with the charge condition which is set;
a memory which registers an initial internal resistance of the secondary battery based on a variation of initial internal resistance values for each of the cell blocks being within a predetermined range, wherein the initial internal resistance of the secondary battery is a resistance before an initial use of the secondary battery; and
a charge controller configured to control outputs of the charging current and the charging voltage of the secondary battery in accordance with the request signal outputted from the controller,
wherein the controller obtains a maximum internal resistance among internal resistances of the plurality of cell blocks, calculates a deterioration coefficient by a ratio of the maximum internal resistance to the initial internal resistance of a cell block exhibiting the maximum internal resistance, and changes the charge condition in accordance with the deterioration coefficient, and
wherein the charge condition includes a charging current value in constant-current charge, and a new charging current value is set to a value equal to an initial charging current multiplied by the deterioration coefficient.

19. The battery charger according to claim 18, wherein:
the charge condition includes a charging voltage value, and the charging voltage value is changed depending upon the deterioration coefficient.

20. The battery charger according to claim 18, wherein the initial internal resistance is measured within a predetermined time period after manufacturing.

* * * * *